United States Patent
Nomura et al.

(10) Patent No.: US 8,454,807 B2
(45) Date of Patent: Jun. 4, 2013

(54) PHOTOELECTROCHEMICAL CELL

(75) Inventors: Takaiki Nomura, Osaka (JP); Takahiro Suzuki, Osaka (JP); Kenichi Tokuhiro, Osaka (JP); Tomohiro Kuroha, Aichi (JP); Noboru Taniguchi, Osaka (JP); Kazuhito Hatoh, Osaka (JP); Shuzo Tokumitsu, Hyogo (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 13/016,488

(22) Filed: Jan. 28, 2011

(65) Prior Publication Data

US 2011/0174610 A1 Jul. 21, 2011

Related U.S. Application Data

(63) Continuation of application No. PCT/JP2010/004000, filed on Jun. 16, 2010.

(30) Foreign Application Priority Data

Jun. 16, 2009 (JP) .................................. 2009-142882

(51) Int. Cl.
  *C25B 13/02* (2006.01)
  *C25B 1/10* (2006.01)
  *C25B 9/08* (2006.01)
(52) U.S. Cl.
  USPC ............ 204/248; 204/266; 205/340; 205/628
(58) Field of Classification Search
  USPC ........................................................ 205/340
  See application file for complete search history.

(56) References Cited

U.S. PATENT DOCUMENTS

| 4,021,323 | A | * | 5/1977 | Kilby et al. | ................... | 136/246 |
| 4,090,933 | A | * | 5/1978 | Nozik | ............................ | 205/340 |
| 4,094,751 | A | * | 6/1978 | Nozik | ............................ | 205/638 |
| 4,100,051 | A | * | 7/1978 | Kilby et al. | ................... | 204/266 |
| 4,525,436 | A | * | 6/1985 | Yamazaki | ..................... | 429/111 |
| 4,634,641 | A | * | 1/1987 | Nozik | ............................ | 429/111 |

(Continued)

FOREIGN PATENT DOCUMENTS

| JP | 51-083895 | 7/1976 |
| JP | 51-123779 | 10/1976 |

(Continued)

*Primary Examiner* — Harry D Wilkins, III
(74) *Attorney, Agent, or Firm* — Hamre, Schumann, Mueller & Larson, P.C.

(57) ABSTRACT

A photoelectrochemical cell (1) is a photoelectrochemical cell for decomposing water by irradiation with light so as to produce hydrogen. This photoelectrochemical cell (1) includes: a conductive substrate; a first electrode (optical semiconductor electrode (3)) including an optical semiconductor and disposed on a first main surface of the conductive substrate; a second electrode (counter electrode (4)) disposed in a region on the first main surface of the conductive substrate where the first electrode is not disposed; an electrolyte containing water and disposed in contact with a surface of the first electrode and a surface of the second electrode; a rib (5) formed to separate a space above the surface of the second electrode from a space above the surface of the first electrode and to extend along a flow direction of a gas produced on the surface of the second electrode, the rib being formed of a material that allows ions to pass therethrough and prevents a gas from passing therethrough; and a container (2) containing the conductive substrate, the first electrode, the second electrode, the electrolyte, and the rib.

5 Claims, 3 Drawing Sheets

U.S. PATENT DOCUMENTS

| | | | |
|---|---|---|---|
| 4,656,103 A * | 4/1987 | Reichman et al. | 429/111 |
| 4,790,916 A * | 12/1988 | Murphy et al. | 205/340 |
| 5,785,768 A * | 7/1998 | Nakata | 136/250 |
| 6,204,545 B1 * | 3/2001 | Nakata | 257/459 |
| 7,459,065 B2 * | 12/2008 | Kelly et al. | 204/248 |
| 2005/0183962 A1 * | 8/2005 | Oakes | 205/340 |

FOREIGN PATENT DOCUMENTS

| | | |
|---|---|---|
| JP | 60-044053 | 3/1985 |
| JP | 4-231301 | 8/1992 |
| JP | 2004-292284 | 10/2004 |
| JP | 2008-075097 | 4/2008 |

* cited by examiner

PHOTOELECTROCHEMICAL CELL

BACKGROUND OF THE INVENTION

1. Field of the Invention

The present invention relates to a photoelectrochemical cell for decomposing water by irradiation with light.

2. Description of Related Art

There are conventionally known techniques for decomposing water into hydrogen and oxygen by irradiating an optical semiconductor with light.

For example, JP 51(1976)-123779 A discloses a technique for producing hydrogen or oxygen on the surfaces of an optical semiconductor electrode and a counter electrode facing each other in an electrolyte by irradiating the surface of the optical semiconductor electrode with light.

JP 04(1992)-231301 A discloses a water photolysis apparatus including a reaction tube in which an optical semiconductor layer is formed on the outer surface of a cylindrical conductor and a counter electrode is formed on the inner surface thereof. This apparatus is configured to separate the produced hydrogen and oxygen from each other by using the inner space and the outer space of the reaction tube. In this apparatus, since the optical semiconductor layer and the counter electrode are formed on the same conductor, there is no need to connect the optical semiconductor layer and the counter electrode electrically by a conducting wire or the like. Therefore, the ohmic loss, etc. can be reduced.

SUMMARY OF THE INVENTION

However, in such an apparatus as disclosed in JP 51(1976)-123779 A, in which an optical semiconductor electrode and a counter electrode facing each other are disposed in an electrolyte, it is difficult to separate produced hydrogen and oxygen from each other. In order to solve this problem, a configuration in which an ion exchanger for separating produced hydrogen and oxygen from each other is provided between the facing electrodes, or a configuration like that of the apparatus disclosed in JP 04(1992)-231301 A is employed.

When sunlight is used as light to be applied to an optical semiconductor, the apparatus must be placed so that that the optical semiconductor faces the sun to receive sunlight. In the configuration in which an optical semiconductor electrode and a counter electrode face each other, the electrode surface opposite to the electrode surface exposed to sunlight is covered with produced hydrogen or oxygen. As a result, the area of contact between water and the electrode decreases, which causes a problem of a decrease in the hydrogen production efficiency. In the configuration like that of the apparatus disclosed in JP 04(1992)-231301 A, in which an optical semiconductor (optical semiconductor electrode) is formed on the outer surface of a cylindrical conductor and a counter electrode is formed on the inner surface thereof, when the apparatus is placed so that the surface of the optical semiconductor electrode faces the sun, hydrogen or oxygen produced on the surface of the optical semiconductor electrode is released from the surface of the optical semiconductor electrode, but oxygen or hydrogen produced on the surface of the counter electrode in the cylinder covers the surface of the counter electrode and is less readily released. Therefore, this configuration has a problem in that the area of contact between water and the counter electrode decreases and thus the hydrogen production efficiency decreases.

Accordingly, it is an object of the present invention to provide a photoelectrochemical cell that allows separate collection of produced hydrogen and oxygen, and prevents the produced gas from covering the electrode surface so as to improve the hydrogen production efficiency.

The photoelectrochemical cell of the present invention is a photoelectrochemical cell for decomposing water by irradiation with light so as to produce hydrogen. This photoelectrochemical cell includes: a conductive substrate; a first electrode including an optical semiconductor and disposed on a first main surface of the conductive substrate; a second electrode disposed in a region on the first main surface of the conductive substrate where the first electrode is not disposed; an electrolyte containing water and disposed in contact with a surface of the first electrode and a surface of the second electrode; a rib formed to separate a space above the surface of the second electrode from a space above the surface of the first electrode and to extend along a flow direction of a gas produced on the surface of the second electrode, the rib being formed of a material that allows ions to pass therethrough and prevents a gas from passing therethrough; and a container containing the conductive substrate, the first electrode, the second electrode, the electrolyte, and the rib.

In the photoelectrochemical cell of the present invention, the first electrode and the second electrode are disposed on the same main surface of the conductive substrate. Generally, in order to enhance the light-use efficiency, a photoelectrochemical cell is placed in an orientation that a first electrode including an optical semiconductor faces a light source to receive light such as sunlight. In the case where the photoelectrochemical cell of the present invention is placed in such an orientation, both the surface of the first electrode and the surface of the second electrode face upward. In this case, gases produced on the surface of the first electrode and the surface of the second electrode can easily move away from the surfaces by buoyancy. Therefore, the gases neither adhere to the surface of the first electrode and the surface of the second electrode nor cover these surfaces. With the configuration of the present invention, as described above, the produced gases do not block the contact between the surfaces of the first and second electrodes and the electrolyte. Therefore, the initial efficiency of water decomposition can be maintained for a long period of time, and thus a decrease in the hydrogen production efficiency can be reduced. Furthermore, since the first electrode and the second electrode are disposed on the same main surface of the conductive substrate, the first electrode can be irradiated with light without being blocked by the second electrode. In addition, since these electrodes are connected electrically to each other by the conductive substrate, the ohmic loss can be reduced. As a result, the quantum efficiency of water photolysis and the sunlight utilization efficiency can be improved. Moreover, since the space above the first electrode and the space above the second electrode are separated from each other by the rib, a gas produced on the surface of the first electrode and a gas produced on the surface of the second electrode can be collected separately from each other.

DETAILED DESCRIPTION OF THE INVENTION

Hereinafter, the embodiment of the present invention will be described in detail with reference to the accompanying drawings. The following embodiment is merely an example, and the present invention is not limited to the following embodiment.

Figure 1:
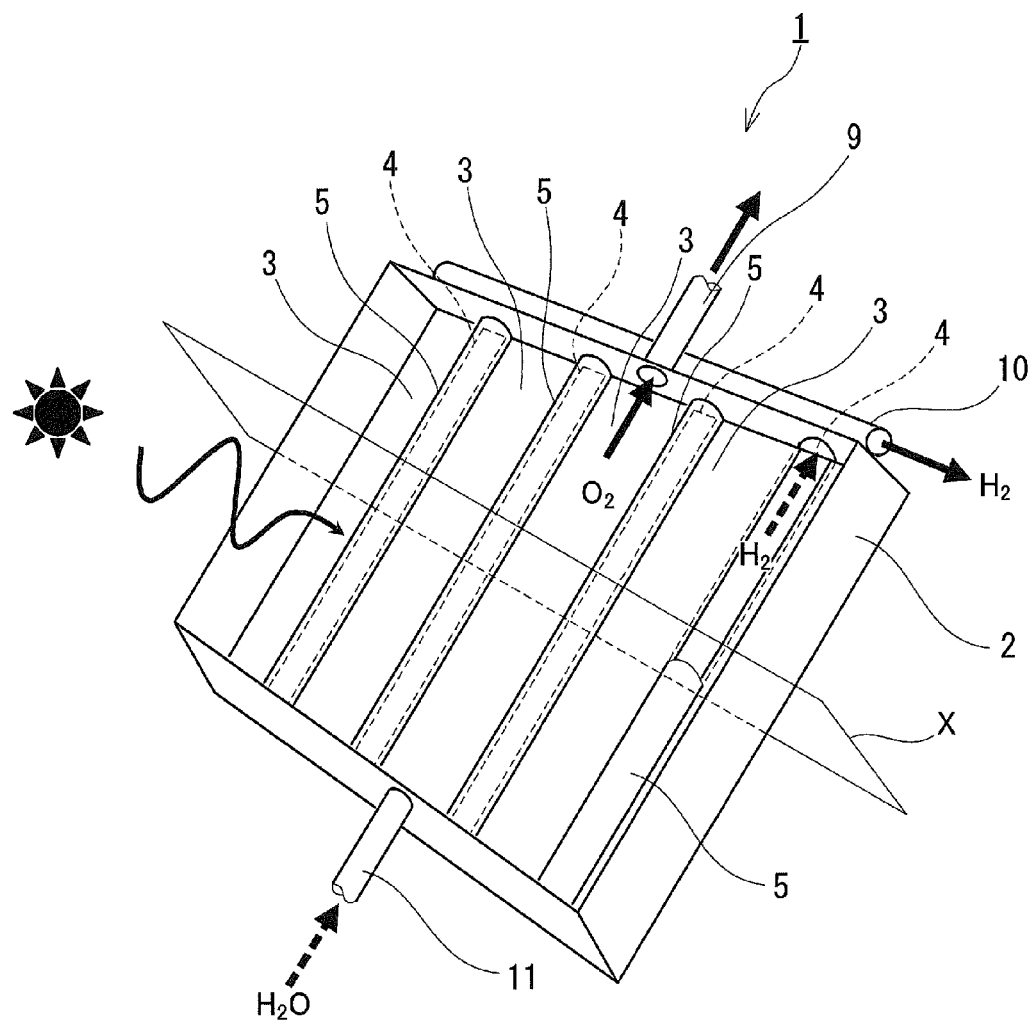
FIG. 1 is a schematic diagram illustrating a configuration of a photoelectrochemical cell in an embodiment of the present invention.
Figure 2:
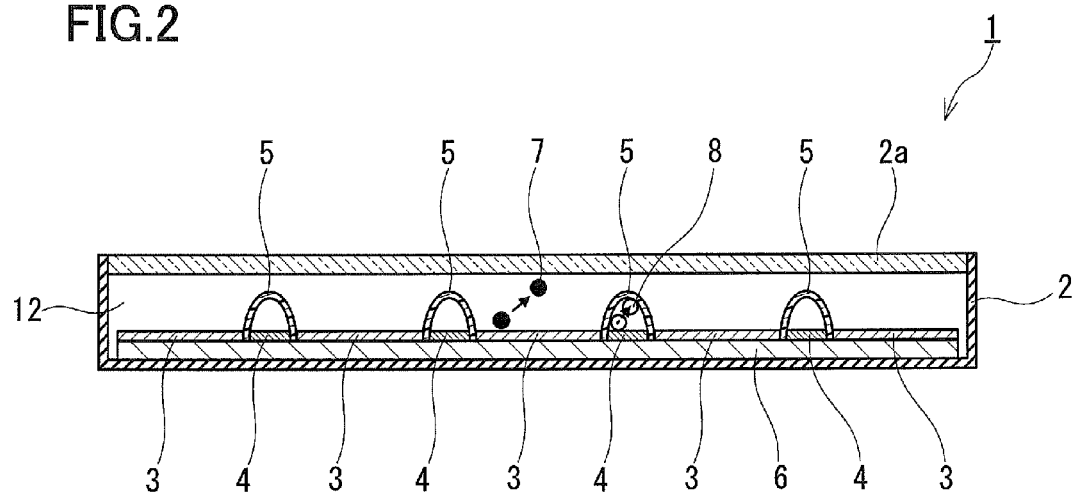
FIG. 2 is a cross sectional view of the photoelectrochemical cell in the embodiment of the present invention shown in FIG. 1, taken along a plane X therein.

FIG. 1 is a schematic diagram illustrating the configuration of a photoelectrochemical cell in an embodiment of the present invention. FIG. 2 shows a cross sectional view of the photoelectrochemical cell shown in FIG. 1, taken along the plane X therein.

As shown in FIG. 1 and FIG. 2, a photoelectrochemical cell 1 in the present embodiment includes: a conductive substrate 6; an optical semiconductor electrode (first electrode) 3 including an optical semiconductor and disposed on the first main surface of the conductive substrate 6; a counter electrode (second electrode) 4 disposed in a region on the first main surface of the conductive substrate 6 where the optical semiconductor electrode 3 is not disposed; an electrolyte 12 containing water and disposed in contact with a surface of the optical semiconductor electrode 3 and a surface of the counter electrode 4; a rib 5 formed to separate a space above the surface of the counter electrode 4 from a space above the surface of the optical semiconductor electrode 3 and to extend along a flow direction of a gas produced on the surface of the counter electrode 4; and a container 2 containing the conductive substrate 6, the optical semiconductor electrode 3, the counter electrode 4, the electrolyte 12, and the rib 5. In the case where the optical semiconductor included in the optical semiconductor electrode 3 is an n-type semiconductor, when the optical semiconductor electrode 3 is irradiated with sunlight, water contained in the electrolyte 12 in the container 2 is decomposed, and as a result, oxygen 7 is produced on the optical semiconductor electrode 3 and hydrogen 8 is produced on the counter electrode 4 simultaneously. In the case where the optical semiconductor is a p-type semiconductor, hydrogen is produced on the optical semiconductor electrode 3 and oxygen is produced on the counter electrode 4. In the present embodiment, the case where the optical semiconductor is an n-type semiconductor is described.

When the photoelectrochemical cell 1 is placed, the container 2 has, on its top, an oxygen outlet 9 for discharging the oxygen 7 produced in the container 2 and a hydrogen outlet 10 for discharging the hydrogen 8 produced therein. The hydrogen and the oxygen are collected from these outlets separately. Since the hydrogen outlet 10 is connected to the space above the surface of the counter electrode 4 separated by the rib 5, only the hydrogen produced on the side of the counter electrode 4 can be collected. On the other hand, since the oxygen outlet 9 is connected to the space above the surface of the optical semiconductor electrode 3, only the oxygen produced on the side of the optical semiconductor electrode 3 can be collected.

Furthermore, in the present embodiment, when the photoelectrochemical cell 1 is placed, the container 2 has, on its bottom, a water inlet 11 for supplying water. With this configuration, the electrolyte 12 flows upward along the surface of the optical semiconductor electrode 3 and the surface of the counter electrode 4, which allows the produced oxygen and hydrogen to move away from the electrode surfaces more efficiently.

FIG. 1 shows a state in which the photoelectrochemical cell 1 is placed so that the optical semiconductor electrode 3 and the counter electrode 4 face upward.

In this placement state, the oxygen 7 produced on the surface of the optical semiconductor electrode 3 can move away from the surface of the optical semiconductor electrode 3 by buoyancy to the upper part of the cell, without adhering to the surface of the optical semiconductor electrode 3 and the surface of the counter electrode 4 covered with the rib 5. The hydrogen 8 produced on the surface of the counter electrode 4 also can move away from the surface of the counter electrode 4 by buoyancy to the upper part of the cell, without adhering to the surface of the optical semiconductor electrode 3 and the surface of the counter electrode 4. As a result, the initial efficiency of water decomposition can be maintained for a long period of time. Furthermore, since the optical semiconductor electrode 3 and the counter electrode 4 are disposed on the same plane, the surface of the optical semiconductor electrode 3 is irradiated with light without being blocked by the counter electrode 4. Therefore, the quantum efficiency of the cell 1 is improved further. Moreover, since the electrodes 3 and 4 are connected electrically to each other by the conductive substrate 6, the ohmic loss also can be reduced. As stated herein, the phrase "the optical semiconductor electrode 3 and the counter electrode 4 face upward" means that the normal vector on the surface of the optical semiconductor electrode 3 and the normal vector on the surface of the counter electrode 4 point upward to the region including the vertically upward direction with respect to the horizontal plane.

Each of the components is described in more detail below.

Preferably, the optical semiconductor constituting the optical semiconductor electrode 3 is formed of a semiconductor having a conduction band edge level of not more than 0 V, which is the standard reduction level of hydrogen ions, and a valence band edge level of not less than 1.23 V, which is the standard oxidation level of water, in order to photolyze water and produce hydrogen. Semiconductors that can be used effectively for that purpose include: oxides, oxynitrides, and nitrides of titanium, tungsten, iron, copper, tantalum, gallium, or indium alone; composite compounds of these oxides, oxynitrides, and nitrides; these oxides, oxynitrides, and nitrides additionally containing alkali metal ions or alkaline earth metal ions; and metals supporting, on their surfaces, iron, copper, silver, gold, platinum, or the like. Among these, metals supporting, on their surfaces, iron, copper, silver, gold, platinum, or the like are used particularly preferably because they have low overvoltages. Furthermore, a multilayer film of a film made of a material having a conduction band edge level of not more than 0 V, which is the standard reduction level of hydrogen ions, and a film made of a material having a valence band edge level of not less than 1.23 V, which is the standard oxidation level of water, also is used effectively. As an example, a $WO_3$/ITO (Indium Tin Oxide)/Si multilayer film or the like, for example, is used effectively.

As the conductive substrate 6, any substrate that forms an ohmic contact with the optical semiconductor constituting the optical semiconductor electrode 3 may be used, and the material thereof is not particularly limited. Generally, a metal substrate is used, but a conductive film substrate in which a conductive film such as ITO or FTO (Fluorine-doped Tin Oxide) is formed on an insulating substrate such as glass also can be used. It is better that a region of the conductive substrate 6 that is not covered by the optical semiconductor electrode 3 be not in contact with water to prevent a cell reaction from occurring in the electrode. Therefore, it is desirable that the region of the conductive substrate 6 that is not covered by the optical semiconductor electrode 3 and the counter electrode 4 be covered by an insulating material such as resin.

A material with a low overvoltage is used suitably for the counter electrode 4. In the present embodiment, hydrogen is produced at the counter electrode 4. Therefore, an electrode made of a metal such as Pt, Au, Ag, or Fe, or an electrode supporting such a metal is used suitably as the counter electrode 4. In the case where a p-type semiconductor is used as the optical semiconductor electrode 3 to produce oxygen at the counter electrode 4 in a photoelectrochemical cell, an electrode made of a metal such as Ni or Pt, or an electrode supporting such a metal is used suitably as the counter electrode 4.

The rib 5 is formed to separate a space above the surface of the counter electrode 4 from a space above the surface of the optical semiconductor electrode 3 and to extend along the flow direction of a gas produced on the surface of the counter electrode 4. In the case where the container 2 is tilted so that the counter electrode 4 faces upward, the rib 5 is formed in a direction that allows hydrogen produced at the counter electrode 4 to smoothly flow upward from the bottom of the container 2 along the slope of the container 2.

The rib 5 is formed of a material that allows ions to pass therethrough and prevents a gas from passing therethrough, and an ion exchanger is used suitably for the rib 5. As the ion exchanger, a polymer solid electrolyte having a high ion transport number, for example, Nafion (registered trademark) manufactured by DuPont, is used desirably. The rib 5 is not limited to such an ion exchanger. A porous membrane such as a polytetrafluoroethylene porous membrane also may be used to form the rib 5. In this case, a porous membrane with such a pore size that allows the electrolyte 12 to pass therethrough and prevents the produced oxygen 7 and hydrogen 8 from passing therethrough can be used. With the rib 5 configured in this manner, the hydrogen gas and oxygen gas are prevented from moving through the rib 5, while hydrogen ions can move from the space on the optical semiconductor electrode 3 side to the space on the counter electrode 4 side through the rib 5. As a result, the hydrogen and oxygen can be collected separately, and the initial efficiency of water decomposition can be maintained for a long period of time, and thus a decrease in the hydrogen production efficiency can be reduced.

In the present embodiment, the rib has a semicircular tubular shape covering the surface of the counter electrode 4 and the space above the surface of the counter electrode 4 and having a semicircular vertical cross section with respect to the extending direction of the rib 5, but the shape of the rib 5 is not limited to this. The rib 5 only has to separate the space above the surface of the counter electrode 4 from the space above the surface of the optical semiconductor electrode 3. Therefore, as the rib 5, for example, a wall extending approximately vertically with respect to the surface of the conductive substrate 6 may be formed at the boundary between the counter electrode 4 and the optical semiconductor electrode 3. Furthermore, the shape of the rib 5 is not limited to a semicircular tubular shape, even if a tubular shape is adopted. The rib 5 may have a rectangular vertical cross section with respect to the extending direction thereof. Preferably, however, the rib 5 has a semicircular tubular shape to ensure the homogeneity of the electrolyte 12 in the container 2 and to reduce the influence of the shadow of the rib 5 when the container 2 is tilted.

It is desirable that the area of the optical semiconductor electrode 3 is larger than that of the counter electrode 4. In this case, since the optical semiconductor electrode 3 can have an increased light receiving area, a photoelectrochemical reaction by light irradiation can be accelerated. Since the current density of the photoelectrochemical cell 1 is about one twentieth that of water electrolysis, the size of the counter electrode 4 can be reduced accordingly. Therefore, if the counter electrode 4 is formed from a platinum catalyst as in the case of water electrolysis, a significant cost reduction can be achieved. The ratio of the area of the optical semiconductor electrode 3 to the area of the counter electrode 4 (the area of the optical semiconductor electrode 3/the area of the counter electrode 4) preferably is 90/10 to 99/1, and further preferably 96/4 or less in view of the sunlight utilization efficiency and the quantum efficiency.

Any electrolyte containing water can be used for the electrolyte 12. The electrolyte 12 may be acidic or alkaline. The electrolyte 12 may be water. A part 2a of the container 2 that faces the optical semiconductor electrode 3 is formed of a light transmitting material.

EXAMPLES

Hereafter, examples of the present invention will be described specifically.

Example 1

As Example 1, a photoelectrochemical cell having the same configuration as the photoelectrochemical cell 1 shown in FIG. 1 and FIG. 2 was fabricated. The photoelectrochemical cell of Example 1 is described below with reference to FIG. 1 and FIG. 2.

As the conductive substrate 6, a titanium metal sheet of 20 cm×10 cm was prepared. Four regions on the first main surface of the conductive substrate 6 were covered with 0.5 cm×10 cm strips of metal masking material, and sputtering was performed to form 3.6 cm×10 cm strips of film on the main surface. Thus, five 3.6 cm wide strips of film were formed at an interval of 0.5 cm in a stripe pattern on the conductive substrate 6. This film was a film corresponding to the optical semiconductor electrode 3 and was formed of titanium oxide (an anatase polycrystalline material with a thickness of 500 nm) as an n-type semiconductor. Next, platinum sheets of 0.2 cm×10 cm as the counter electrodes 4 were attached to regions on the first main surface of the conductive substrate 6 where the titanium oxide film was not formed, to keep the platinum sheets from coming in contact with the titanium oxide film. Furthermore, semicircular tubular ribs 5 of 0.5 cm (outer diameter)×10 cm (length) were formed to cover the surfaces of the counter electrodes 4 and the spaces above the surfaces of the counter electrodes 4. The ribs 5 were joined to regions on the first main surface of the conductive substrate 6 where the optical semiconductor electrodes 3 and the counter electrodes 4 were not formed. Nafion (registered trademark) manufactured by DuPont, with a thickness of 25.4 µm, was used to form the ribs 5. The container 2 was tilted at an angle of 60° with respect to the horizontal plane so that the optical semiconductor electrodes 3 and the counter electrodes 4 were irradiated with sunlight at a right angle. Water with a pH of 0 was prepared and used as the electrolyte in the container 2. The ratio of the total area of the optical semiconductor electrodes 3 to the total area of the counter electrodes 4 in the photoelectrochemical cell 1 of Example 1 was 96/4 (optical semiconductor electrodes/counter electrodes).

<Sunlight Irradiation Experiment>

The photoelectrochemical cell 1 was actually irradiated with sunlight, and as a result, it was confirmed that the oxygen 7 was produced on the surfaces of the optical semiconductor electrodes 3 and the hydrogen 8 was produced on the surfaces of the counter electrodes 4. Then, the oxygen production rate and the hydrogen production rate were measured. As a result, the oxygen production rate was $3.0 \times 10^{-6}$ L/s, and the hydrogen production rate was $6.0 \times 10^{-6}$ L/s, and the ratio between the oxygen production and the hydrogen production was approximately 1:2. Thus, it was stoichiometrically confirmed that water was decomposed. The photocurrent flowing between the optical semiconductor electrode 3 and the counter electrode 4 was measured. As a result, the photocurrent was 45.1 mA, and thus it was stoichiometrically confirmed that water was electrolyzed. The solar-to-hydrogen (STH) conversion efficiency of the photoelectrochemical cell was calculated based on this value. As a result, the STH efficiency of the photoelectrochemical cell was about 0.28% as shown in Table 1.

Furthermore, the apparent quantum efficiency of the optical semiconductor electrodes was calculated using the following formula:

Apparent quantum efficiency={(measured photocurrent density [mA/cm$^2$])/(photocurrent density that can be obtained by the sunlight to be possibly absorbed in the band gap of the semiconductor material used for the optical semiconductor [mA/cm$^2$])}×100

As a result, the apparent quantum efficiency was about 27.2% as shown in Table 1. In the case where anatase-type titanium oxide is used as a semiconductor material as in the case of the present example, "the photocurrent density that can be obtained by the sunlight to be possibly absorbed in the band gap of the semiconductor material used for the optical semiconductor" is 0.92 [mA/cm$^2$].

Example 2

A photoelectrochemical cell 1 of Example 2 was fabricated in the same manner as in Example 1, except that the optical semiconductor electrodes 3 were formed from five strips of 1 cm×10 cm and the counter electrodes 4 were formed from four strips of 2.6 cm×10 cm. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency of the photoelectrochemical cell and the quantum efficiency of the optical semiconductor electrodes were obtained in the same manner as in Example 1. Table 1 shows the oxygen production rate, the hydrogen production rate, the measured photocurrent, the STH conversion efficiency of the photoelectrochemical cell, and the quantum efficiency of the optical semiconductor electrodes thus obtained.

Example 3

A photoelectrochemical cell 1 of Example 3 was fabricated in the same manner as in Example 1, except that the optical semiconductor electrodes 3 were formed from five strips of 1.9 cm×10 cm and the counter electrodes 4 were formed from four strips of 1.9 cm×10 cm. The sunlight irradiation experiment was conducted on this photoelectrochemical cell 1 in the same manner as in Example 1, and as a result, it was confirmed that the oxygen 7 was produced on the surfaces of the optical semiconductor electrodes 3 and the hydrogen 8 was produced on the surfaces of the counter electrodes 4. The STH conversion efficiency of the photoelectrochemical cell and the quantum efficiency of the optical semiconductor electrodes were obtained in the same manner as in Example 1. Table 1 shows the oxygen production rate, the hydrogen production rate, the measured photocurrent, the STH conversion efficiency of the photoelectrochemical cell, and the quantum efficiency of the optical semiconductor electrodes thus obtained.

Example 4

A photoelectrochemical cell 1 of Example 4 was fabricated in the same manner as in Example 1, except that the optical semiconductor electrodes 3 were formed from five strips of 2.6 cm×10 cm and the counter electrodes 4 were formed from four strips of 1.0 cm×10 cm. The sunlight irradiation experiment was conducted on this photoelectrochemical cell 1 in the same manner as in Example 1, and as a result, it was confirmed that the oxygen 7 was produced on the surfaces of the optical semiconductor electrodes 3 and the hydrogen 8 was produced on the surfaces of the counter electrodes 4. The STH conversion efficiency of the photoelectrochemical cell and the quantum efficiency of the optical semiconductor electrodes were obtained in the same manner as in Example 1. Table 1 shows the oxygen production rate, the hydrogen production rate, the measured photocurrent, the STH conversion efficiency of the photoelectrochemical cell, and the quantum efficiency of the optical semiconductor electrodes thus obtained.

Example 5

A photoelectrochemical cell 1 of Example 5 was fabricated in the same manner as in Example 1, except that the optical semiconductor electrodes 3 were formed from five strips of 3.4 cm×10 cm and the counter electrodes 4 were formed from four strips of 0.4 cm×10 cm. The sunlight irradiation experiment was conducted on this photoelectrochemical cell 1 in the same manner as in Example 1, and as a result, it was confirmed that the oxygen 7 was produced on the surfaces of the optical semiconductor electrodes 3 and the hydrogen 8 was produced on the surfaces of the counter electrodes 4. The STH conversion efficiency of the photoelectrochemical cell and the quantum efficiency of the optical semiconductor electrodes were obtained in the same manner as in Example 1. Table 1 shows the oxygen production rate, the hydrogen production rate, the measured photocurrent, the STH conversion efficiency of the photoelectrochemical cell, and the quantum efficiency of the optical semiconductor electrodes thus obtained.

Example 6

A photoelectrochemical cell 1 of Example 6 was fabricated in the same manner as in Example 1, except that the optical semiconductor electrodes 3 were formed from five strips of 3.66 cm×10 cm and the counter electrodes 4 were formed from four strips of 0.07 cm×10 cm. The sunlight irradiation experiment was conducted on this photoelectrochemical cell 1 in the same manner as in Example 1, and as a result, it was confirmed that the oxygen 7 was produced on the surfaces of the optical semiconductor electrodes 3 and the hydrogen 8 was produced on the surfaces of the counter electrodes 4. The STH conversion efficiency of the photoelectrochemical cell and the quantum efficiency of the optical semiconductor electrodes were obtained in the same manner as in Example 1. Table 1 shows the oxygen production rate, the hydrogen production rate, the measured photocurrent, the STH conversion efficiency of the photoelectrochemical cell, and the quantum efficiency of the optical semiconductor electrodes thus obtained.

TABLE 1

| | Example 1 | Example 2 | Example 3 | Example 4 | Example 5 | Example 6 |
|---|---|---|---|---|---|---|
| Optical semiconductor electrode/counter electrode | 96/4 | 32/68 | 56/44 | 76/24 | 91/9 | 98/2 |
| Oxygen production rate ($\times 10^{-6}$ L/s) | 3.0 | 0.83 | 1.6 | 2.2 | 2.8 | 1.6 |
| Hydrogen production rate ($\times 10^{-6}$ L/s) | 6.0 | 1.7 | 3.2 | 4.3 | 5.6 | 3.2 |
| Photocurrent ($\times 10$ mA) | 4.5 | 1.3 | 2.4 | 3.3 | 4.2 | 2.4 |
| Solar-to-hydrogen (STH) conversion efficiency of photoelectrochemical cell (%) | 0.28 | 0.08 | 0.15 | 0.21 | 0.26 | 0.15 |
| Quantum efficiency of optical semiconductor electrode (%) | 27.2 | 28.2 | 27.5 | 27.6 | 27.0 | 14.2 |

As seen from the comparison of the results of the photoelectrochemical cells 1 of Examples 1 to 6, as the total area of the optical semiconductor electrodes 3 increased, the light receiving area increased, and thus the sunlight utilization efficiency also increased. These results showed that the total area of the optical semiconductor electrodes 3 preferably was larger than that of the counter electrodes 4. In the case of Example 6, however, since the percentage of the total area of the counter electrodes 4 was very small, the sunlight utilization efficiency was not very high although the total area of the optical semiconductor electrodes 3 was largest. On the other hand, it was found that although the quantum efficiency did not vary so much when the area ratio between the optical semiconductor electrodes 3 and the counter electrodes 4 was in the range of 32/68 and 96/4, it decreased when the area ratio is 98/2 due to excessive current density. This result showed that the area ratio between the optical semiconductor electrodes and the counter electrodes preferably was 96/4 or less.

Comparative Example 1

A photoelectrochemical cell 1 was fabricated in the same manner as in Example 1, except that Teflon (registered trademark) that did not allow ions to pass therethrough was used as a material for the ribs 5. The sunlight irradiation experiment was conducted on this photoelectrochemical cell 1 of Comparative Example 1 in the same manner as in Example 1. As a result, it was confirmed that neither oxygen nor hydrogen was produced at the optical semiconductor electrodes 3 and the counter electrodes 4. This is because the Teflon (registered trademark) tube did not allow hydrogen ions in the space of the optical semiconductor electrode 3 side to pass through it to the space of the counter electrode 4 side.

Comparative Example 2

A photoelectrochemical cell 1 was fabricated in the same manner as in Example 1, except that the ribs 5 were not provided. The sunlight irradiation experiment was conducted on this photoelectrochemical cell 1 of Comparative Example 2 in the same manner as in Example 1, and it was confirmed that oxygen was produced at the optical semiconductor electrodes 3 and hydrogen was produced at the counter electrodes 4. However, since the ribs 5 were not provided, hydrogen and oxygen were collected as a mixture thereof. This mixture was analyzed by gas chromatography, and the production rates of oxygen and hydrogen in the mixture were measured. As a result, the oxygen production rate was $2.5 \times 10^{-6}$ L/s and the hydrogen production rate was $5.0 \times 10^{-6}$ L/s, and the ratio between the oxygen production and the hydrogen production was 1:2. Thus, it was stoichiometrically confirmed that water was decomposed. Nevertheless, no separation between hydrogen and oxygen resulted in a recombination reaction of hydrogen and oxygen in the vicinity of the interface between the electrodes, which was presumably the cause of poorer performance than Example 1.

Example 7

A photoelectrochemical cell 1 of Example 7 was fabricated in the same manner as in Example 1, except that plating was used to form the counter electrodes 4. Specifically, the platinum sheets of 0.2 cm×10 cm as the counter electrodes 4 were not attached to the conductive substrate 6, but instead, the surfaces of the optical semiconductor electrodes 3 and the regions on the surface of the conductive substrate 6 where the counter electrodes 4 were not to be formed were masked with a fluororesin tape, and then, the regions on the first main surface of the conductive substrate 6 where the optical semiconductor electrodes 3 were not provided were electroplated with platinum by using a titanium metal plate as a cathode. The conditions of this plating were as follows. A plating bath containing 10 g/L of sodium tetrachloroplatinate (II), 40 g/L of boric acid, and 20 g/L of ammonium chloride was prepared, and the temperature of this plating bath and the current density were set to 80° C. and 1 mA/cm² respectively. The plating was performed for 300 seconds to form a platinum film with a thickness of about 100 nm, and thus the counter electrodes 4 were formed. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Example 8

A photoelectrochemical cell 1 of Example 8 was fabricated in the same manner as in Example 7, except that when the counter electrodes 4 were fabricated by plating, a current density of 1 mA/cm² was not applied, but instead, the optical semiconductor electrodes 3 were irradiated with sunlight at an intensity of 0.1 W/cm² for 600 seconds so as to a form a platinum film with a thickness of about 100 nm. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Example 9

A photoelectrochemical cell 1 of Example 9 was fabricated in the same manner as in Example 8, except that when the counter electrodes 4 were fabricated by plating, the optical semiconductor electrodes 3 were irradiated with sunlight at an intensity of 0.1 W/cm$^2$ for 300 seconds so as to form a platinum film with a thickness of about 50 nm. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Example 10

A photoelectrochemical cell 1 of Example 10 was fabricated in the same manner as in Example 7, except that nickel electroplating was performed, instead of platinum electroplating in Example 7. Specifically, a plating bath containing 30 g/L of nickel (II) sulfate, 40 g/L of boric acid, and 20 g/L of ammonium chloride was prepared, and the temperature of this plating bath and the current density were set to 80° C. and 1 mA/cm$^2$ respectively. The plating was performed for 400 seconds to form a nickel film with a thickness of about 100 nm, and thus the counter electrodes 4 were formed. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Example 11

A photoelectrochemical cell 1 of Example 11 was fabricated in the same manner as in Example 10, except that when the counter electrodes 4 were fabricated by plating, a current density of 1 mA/cm$^2$ was not applied, but instead, the optical semiconductor electrodes 3 were irradiated with sunlight at an intensity of 0.1 W/cm$^2$ for 800 seconds so as to form a nickel film with a thickness of about 100 nm. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Comparative Example 3

Figure 3:
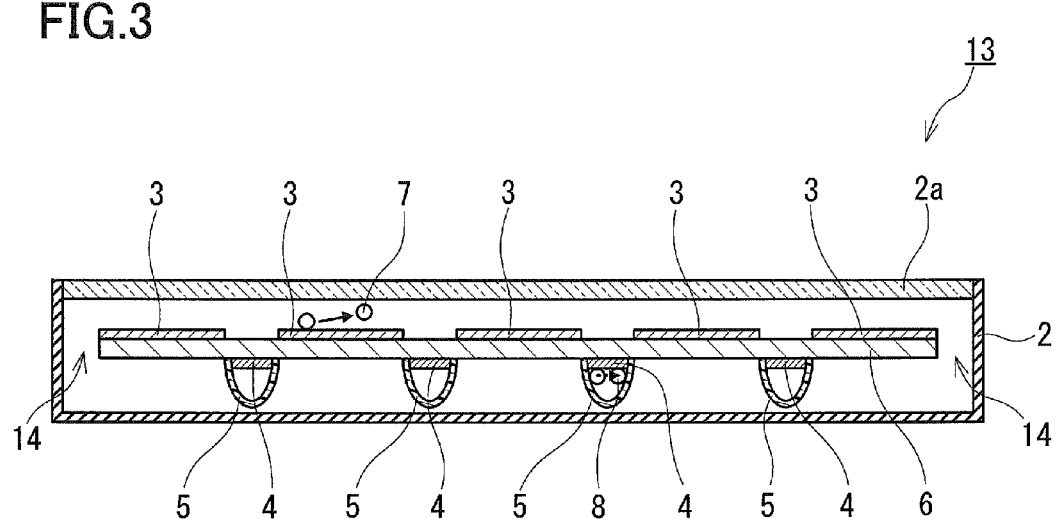
FIG. 3 is a schematic diagram illustrating a configuration of a photoelectrochemical cell in Comparative Example 3.

In Example 1, the counter electrodes 4 of platinum sheets were formed on the first main surface of the conductive substrate 6, but in Comparative Example 3, as shown in FIG. 3, the counter electrodes 4 were attached to regions on the back surface (the main surface opposite to the first main surface) of the conductive substrate 6 corresponding to the regions where the counter electrodes 4 were attached in Example 1. Openings 14 were each formed with a width of 1 cm from the edge of the optical semiconductor electrode 3 so that hydrogen ions could move between the optical semiconductor electrodes 3 and the counter electrodes 4. A photoelectrochemical cell 13 of Comparative Example 3 was fabricated in the same manner as in Example 1 except for these differences. The sunlight irradiation experiment was conducted on this photoelectrochemical cell 13 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Comparative Example 4

A photoelectrochemical cell 13 of Comparative Example 4 was fabricated in the same manner as in Comparative Example 3, except that plating was used to form the counter electrodes 4. Specifically, the platinum sheets of 0.2 cm×10 cm as the counter electrodes 4 were attached to the back surface of the conductive substrate 6 in Comparative Example 3, but instead, the surfaces of the optical semiconductor electrodes 3 and the regions on the back surface of the conductive substrate 6 where the counter electrodes 4 were not to be formed were masked with a fluororesin tape, and then, the unmasked regions on the back surface of the conductive substrate 6 were electroplated with platinum by using a titanium metal plate as a cathode. The conditions of this plating were as follows. A plating bath containing 10 g/L of sodium tetrachloroplatinate (II), 40 g/L of boric acid, and 20 g/L of ammonium chloride was prepared, and the temperature of this plating bath and the current density were set to 80° C. and 1 mA/cm$^2$ respectively. The plating was performed for 300 seconds to form a platinum film with a thickness of about 100 nm, and thus the counter electrodes 4 were formed. The sunlight irradiation experiment was conducted on this photoelectrochemical cell 13 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

Comparative Example 5

A photoelectrochemical cell 13 of Comparative Example 5 was fabricated in the same manner as in Comparative Example 4, except that when the counter electrodes 4 were fabricated by plating, a current density of 1 mA/cm$^2$ was not applied, but instead, the optical semiconductor electrodes 3 were irradiated with sunlight at an intensity of 0.1 W/cm$^2$ for 600 seconds so as to form a platinum film with a thickness of about 100 nm. The sunlight irradiation experiment was conducted on this photoelectrochemical cell 13 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 2 was obtained.

TABLE 2

| | Oxygen production rate (×10$^{-6}$ L/s) | Hydrogen production rate (×10$^{-6}$ L/s) | Photo-current (×10 mA) | Solar-to-hydrogen (STH) conversion efficiency of photoelectrochemical cell (%) |
|---|---|---|---|---|
| Example 1 | 3.0 | 6.0 | 4.5 | 0.28 |
| Example 7 | 6.5 | 13 | 9.0 | 0.56 |
| Example 8 | 6.1 | 12 | 8.4 | 0.53 |
| Example 9 | 6.0 | 12 | 8.2 | 0.51 |
| Example 10 | 6.2 | 12 | 8.5 | 0.53 |
| Example 11 | 5.9 | 11 | 8.1 | 0.50 |
| Comparative Example 3 | 1.6 | 3.1 | 2.2 | 0.14 |
| Comparative Example 4 | 3.1 | 6.1 | 4.3 | 0.27 |
| Comparative Example 5 | 3.0 | 5.8 | 4.1 | 0.26 |

As shown in Table 2, comparisons between Example 1 and Examples 7 to 11 showed that the sunlight utilization efficiency increased when the counter electrodes 4 were fabricated by electroplating. This is because the crystal faces of platinum or nickel having high reactivity were exposed by plating. Furthermore, the cells obtained by electroplating by sunlight irradiation also achieve as high sunlight utilization efficiency as the cells obtained by current application, which leads to a saving of fabrication energy. Moreover, a use of a nickel-plated film instead of a platinum-plated film leads to a reduction in cost.

Example 12

As Example 12, a photoelectrochemical cell having the same structure as the photoelectrochemical cell 1 shown in FIG. 1 and FIG. 2 was fabricated. The photoelectrochemical cell of Example 12 is described below with reference to FIG. 1 and FIG. 2.

As the conductive substrate 6, a titanium metal sheet of 20 cm×10 cm was prepared. Titanium oxide (an anatase polycrystalline material with a thickness of 500 nm) as an n-type semiconductor was formed on the entire first main surface of the conductive substrate 6. Then, 0.4 cm×10 cm strips of titanium oxide film were removed by shot blasting so that five 3.6 cm wide strips of titanium oxide film were formed at an interval of 0.4 cm in a stripe pattern. Thus, the optical semiconductor electrodes 3 were formed. The surfaces of the optical semiconductor electrodes 3 and the regions on the surface of the conductive substrate 6 where the counter electrodes 4 were not to be formed were masked with a fluororesin tape, and then, the regions on the first main surface of the conductive substrate 6 where the optical semiconductor electrodes 3 were not provided were electroplated with platinum by using a titanium metal plate as a cathode. The conditions of this plating were as follows. A plating bath containing 10 g/L of sodium tetrachloroplatinate (II), 40 g/L of boric acid, and 20 g/L of ammonium chloride was prepared, and the temperature of this plating bath and the current density were set to 80° C. and 1 mA/cm$^2$ respectively. The plating was performed for 300 seconds to form a platinum film with a thickness of about 100 nm, and thus the counter electrodes 4 of 0.2 cm×10 cm were formed. Furthermore, semicircular tubular ribs 5 of 0.4 cm (outer diameter)×10 cm (length) were formed to cover the surfaces of the counter electrodes 4 and the spaces above the surfaces of the counter electrodes 4. The ribs 5 were joined to regions on the first main surface of the conductive substrate 6 where the optical semiconductor electrodes 3 and the counter electrodes 4 were not formed. Nafion (registered trademark) manufactured by DuPont, with a thickness of 25.4 μm, was used to form the ribs 5. Water with a pH of 0 was prepared and used as the electrolyte in the container 2. The container 2 was tilted at an angle of 60° with respect to the horizontal plane so that the optical semiconductor electrodes 3 and the counter electrodes 4 were irradiated with sunlight at a right angle. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 3 was obtained.

Example 13

A photoelectrochemical cell 1 of Example 13 was fabricated in the same manner as in Example 12, except that when the counter electrodes 4 were fabricated by plating, a current density of 1 mA/cm$^2$ was not applied, but instead, the optical semiconductor electrodes 3 were irradiated with sunlight at an intensity of 0.1 W/cm$^2$ for 600 seconds so as to a form a platinum film with a thickness of about 100 nm. The sunlight irradiation experiment was conducted on this photoelectrochemical cell 1 in the same manner as in Example 1. As a result, it was confirmed that the oxygen 7 was produced on the surfaces of the optical semiconductor electrodes 3 and the hydrogen 8 was produced on the surfaces of the counter electrodes 4. The STH conversion efficiency was calculated in the same manner as in Example 1, and the value shown in Table 3 was obtained.

TABLE 3

| | Oxygen production rate (×10$^{-6}$ L/s) | Hydrogen production rate (×10$^{-6}$ L/s) | Photo-current (×10 mA) | Solar-to-hydrogen (STH) conversion efficiency of photoelectrochemical cell (%) |
|---|---|---|---|---|
| Example 12 | 8.0 | 15 | 11.0 | 0.69 |
| Example 7 | 6.5 | 13 | 9.0 | 0.56 |
| Example 13 | 7.5 | 15 | 10.4 | 0.65 |
| Example 8 | 6.1 | 12 | 8.4 | 0.53 |

For comparison, Table 3 also shows the results of Example 7 and Example 8, in which the counter electrodes 4 of the same shape were fabricated by the same plating method as in Example 12 and Example 13. Comparisons between the results of Example 12 and those of Example 7 and the results of Example 13 and those of Example 8 showed that Example 12 and Example 13 achieved higher sunlight utilization efficiencies. Presumably, this is because the conductive substrate 6 was subjected to shot blasting in Examples 12 and 13, which increased the surface area of the counter electrodes 4.

INDUSTRIAL APPLICABILITY

The photoelectrochemical cell of the present invention can easily achieve separate collection of hydrogen and oxygen, and can improve the quantum efficiency of hydrogen evolution reaction by irradiation with light and the sunlight utilization efficiency. Accordingly, the photoelectrochemical cell of the present invention can be used suitably as a hydrogen source for a fuel cell, or the like.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A photoelectrochemical cell for decomposing water by irradiation with light so as to produce hydrogen, the cell comprising:
   a conductive substrate;
   a first electrode including an optical semiconductor and disposed on a first main surface of the conductive substrate;
   a second electrode disposed in a region on the first main surface of the conductive substrate where the first electrode is not disposed;
   an electrolyte containing water and disposed in contact with a surface of the first electrode and a surface of the second electrode;
   a rib formed to separate a space above the surface of the second electrode from a space above the surface of the first electrode, and to extend along a flow direction of a gas produced on the surface of the second electrode, the rib being formed of a material that allows ions to pass therethrough and prevents a gas from passing therethrough; and
   a container containing the conductive substrate, the first electrode, the second electrode, the electrolyte, and the rib,
   wherein the rib covers the surface of the second electrode so as to enclose the space above the surface of the second electrode.

2. The photoelectrochemical cell according to claim 1, wherein the rib has a semicircular tubular shape having a semicircular vertical cross section with respect to an extending direction of the rib.

3. The photoelectrochemical cell according to claim 1, wherein an area of the first electrode is larger than an area of the second electrode.

4. The photoelectrochemical cell according to claim 1, wherein a ratio of the area of the first electrode to the area of the second electrode (the area of the first electrode/the area of the second electrode) is 96/4 or less.

5. The photoelectrochemical cell according to claim 1, wherein the rib is formed of an ion exchanger.

* * * * *